United States Patent [19]

Lambert et al.

[11] 4,271,223

[45] Jun. 2, 1981

[54] PLASTIC FILM LABEL STOCK

[75] Inventors: Richard J. Lambert, Eau Galle Township, St. Croix County, Wis.; John A. Martens, Lino Lakes Township, Anoka County, Minn.

[73] Assignee: Minnesota Mining and Manufacturing Company, St. Paul, Minn.

[21] Appl. No.: 81,177

[22] Filed: Oct. 11, 1979

Related U.S. Application Data

[63] Continuation-in-part of Ser. No. 957,238, Nov. 2, 1978, abandoned.

[51] Int. Cl.$^3$ .......................... B32B 3/00; C08F 2/46
[52] U.S. Cl. .................... 428/207; 204/159.19; 204/159.22; 204/159.23; 260/31.2 N; 283/21; 428/261; 428/337; 428/343; 428/423.1; 525/440; 526/282; 526/301; 526/328.5

[58] Field of Search ............... 428/337, 261, 480, 423, 428/425, 343, 352; 526/282, 301, 328.5; 525/440, 126, 445; 260/31.2N; 204/159.19, 159.22, 159.23; 283/21

[56] References Cited

U.S. PATENT DOCUMENTS

| Re. 24,906 | 12/1960 | Ulrich | 428/480 X |
|---|---|---|---|
| 3,641,199 | 2/1972 | Niederhauser et al. | 525/440 |
| 3,678,014 | 7/1972 | Suzuki et al. | 526/301 |
| 3,700,643 | 10/1972 | Smith | 526/282 |
| 3,850,770 | 11/1974 | Juna et al. | 204/159.19 |
| 3,886,111 | 5/1975 | Yoshimura et al. | 260/31.2 N |
| 3,907,865 | 9/1975 | Miyata et al. | 204/159.23 X |
| 3,928,299 | 12/1975 | Rosenkranz et al. | 260/31.2 N X |
| 3,954,584 | 5/1976 | Miyata et al. | 204/159.22 X |
| 3,967,031 | 6/1976 | Lambert | 428/352 X |
| 4,131,716 | 12/1978 | Bertozzi | 428/425 |

*Primary Examiner*—Thomas J. Herbert, Jr.

[57] ABSTRACT

Label stock comprising a plastic film backing which is a polymer of a urethane oligomer and affords unusually good ink receptivity.

17 Claims, No Drawings

PLASTIC FILM LABEL STOCK

CROSS-REFERENCE TO RELATED APPLICATION

This is a continuation-in-part of applicants' copending application Ser. No. 957,238 filed Nov. 2, 1978, now abandoned.

BACKGROUND OF THE INVENTION

Plastic film label stock is in widespread use, being less expensive than metal label stock and more durable than paper label stock. Usually both the plastic film backing and the adhesive layer are quite thin to minimize edge scuffing and accumulation of dirt at the edges of an applied label. While the plastic film backing should have sufficient integrity to permit the label stock to be handled in commerce and preferably able to withstand die-cutting into labels, it sometimes is designed to be brittle so as to break into small pieces if any effort is made to remove an applied label.

The ink-receiving surface of the plastic film backing is usually given an adhesion-promoting treatment, for example, by corona discharge or by the application of an ultrathin primer coating. Even so, there has been a long-felt need for improved adhesion between ordinary printing inks and the plastic film backing so as to provide improved resistance of the printing to abrasion.

THE PRESENT INVENTION

The present invention concerns what is believed to be the first plastic film label stock to which ordinary printing inks adhere strongly without any surface treatment of the plastic film backing so that printing on the labels is highly resistant to abrasion. For example, nitrocellulose-based flexographic inks, which have been widely used because of their low cost even though they normally provide minimal abrasion resistance, are highly resistant to abrasion when applied to untreated plastic film label stock of the present invention.

These important and surprising advantages are obtained by label stock comprising a thin adhesive layer and a plastic film backing which comprises a polymer of the addition-polymerizable urethane oligomer $$X(OCNH-Y-NHCO-Z)_n \quad \text{Formula I}$$

where Z is an end-capping addition-polymerizable moiety comprising acrylyl, methacrylyl, allyl or vic-epoxy groups; Y is the divalent residue of an organic diisocyanate, $Y(NCO)_2$, and Y represents an alkylene group with 4 to 13 carbon atoms, a cycloalkylene group or an arylene group; and X is the residue of oligomeric alcohol, $X(OH)_n$, wherein n has an average value of 1 to 4, said alcohol having a number average molecular weight of 500 to 5000 and a glass transition temperature below 250° K. Suitable oligomeric alcohols, $X(OH)_n$, include polyester polyols, polyether polyols, polyacrylate polyols, polyolefin polyols, and polysiloxane polyols. The oligomeric alcohol may have some internal crosslinks.

The divalent residue Y of the aforementioned organic diisocyanate may be:

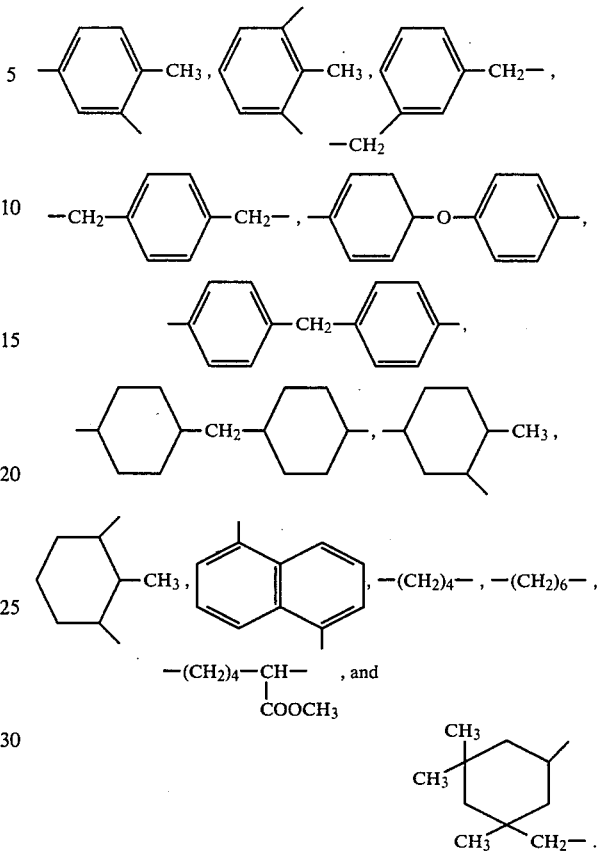

Of these, the aromatics are less preferred because they tend to cause yellowing upon exposure to sunlight.

Suitable addition-polymerizable urethane oligomers are known, e.g., polyesterurethane acrylates and methacrylates such as those disclosed in U.S. Pat. Nos. 3,641,199 and 3,907,574; polycaprolactoneurethane acrylates and methacrylates disclosed in U.S. Pat. No. 3,700,643; poly(alkylene ether)urethane acrylates and methacrylates such as disclosed in U.S. Pat. Nos. 3,448,171, 3,850,770, 3,907,865 and 3,954,584; and polyolefinurethane acrylates and methacrylates such as the polybutadieneurethane acrylates and methacrylates of U.S. Pat. No. 3,678,014; polypentadieneurethane acrylates and methacrylates of U.S. Pat. No. 3,886,111; and polyacrylateurethane acrylates and methacrylates of U.S. Pat. No. 3,928,299.

The preferred plastic film backing is a radiation-crosslinked polymer of addition-polymerizable urethane oligomer having the formula

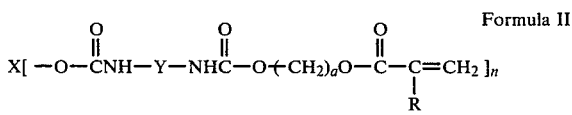

where X, Y and n are as defined for Formula I except that n has an average value of 2 to 4, a is an integer having a value of 2 to 6, and R is hydrogen or methyl.

These urethane oligomers are readily converted into plastic films by photopolymerization in the presence of photoinitiators in an inert atmosphere, preferably using ultraviolet radiation as described in the aforementioned U.S. Pat. No. 3,700,643 beginning at col. 14, line 74.

Suitable photoinitiators are listed at col. 14, lines 12–25. The photoinitiators may be employed in amounts within about 0.1 to 10% of the total weight of the photopolymerizable mixture, but preferably at less than one percent because of their rather high cost. As described at col. 17, lines 33–44 of U.S. Pat. No. 3,700,643, exposure to the ultraviolet radiation may be from about 0.1 second to about 2 minutes. Other forms of radiation for converting the oligomers are disclosed at col. 14, line 44 et seq. of U.S. Pat. No. 3,700,643.

The addition-polymerizable urethane oligomers occasionally are viscous liquids which in some cases can be coated out at room temperature to the desired thickness, but it is often necessary for coatability to reduce their viscosity with one or more reactive diluents, such as styrene, alpha-methyl styrene, and acrylyl compounds such as acrylate esters, methacrylate esters, acrylamides, and methacrylamides. Suitable acrylyl reactive diluents have the formula at col. 13, line 36 of U.S. Pat. No. 3,700,643 and are listed beginning at col. 13, line 57. A preferred reactive diluent is N-n-butylcarbamoylethyl methacrylate which has been used in amounts up to 100% of the weight of the urethane oligomer without noticeably affecting the ink receptivity or other desirable physical properties of the resultant plastic film.

Some useful reactive diluents form crosslinks with the urethane oligomer, thus making the plastic film more brittle and the labels more tamperproof. Suitable crosslinking reactive diluents include multifunctional acrylates or methacrylates such as trimethylolpropane triacrylate, 1,6-hexanediol diacrylate, and pentaerythritol triacrylate. At more than 50 parts by weight of crosslinking reactive diluent per 100 parts oligomer, the film may become inflexible. The plastic film by itself is preferably capable of being wound on a wire 0.5 mm in diameter without any cracking.

The coating syrup comprising the urethane oligomer and any reactive diluent may contain dye or pigment which may afford a degree of translucency, taking care not to introduce undue opacity where the polymerization is to be initiated by ultraviolet radiation. The coating syrup should not contain any appreciable amount of unreactive solvent which would become trapped in the plastic film during the polymerization, because this would cause shrinkage and distortion of the plastic film upon volatilization of the solvent.

The plastic film backing preferably has a thickness of about 50–100 micrometers. If its thickness were less than 25 micrometers, the film would tend to be too difficult to handle, whereas above 150 micrometers, it would tend not to have the conformability desired for application of labels to moderately uneven surfaces. Also the edges of the labels would tend to collect dirt and to be caught by objects, thus fraying the edges.

For ease and convenience of applying printed labels, the adhesive layer of the label stock is preferably a pressure-sensitive adhesive such as disclosed in U.S. Pat. No. Re. 24,906 (Ulrich). Solvent-activatable and heat-activatable adhesives can also be used and may be applied from solution or dispersion directly onto the plastic film. Adequate bonding usually can be attained at adhesive thicknesses of about 20 to 100 micrometers. When using a pressure-sensitive adhesive, the adhesive conveniently is coated onto a low-adhesion carrier and pressed against the plastic film, so that the carrier protects the adhesive from contamination. Alternatively, a coating syrup comprising the addition-polymerizable urethane oligomer and any reactive diluent may be coated directly onto the pressure-sensitive adhesive while it is supported by the low-adhesion carrier.

Surprisingly good resistance of the ink to abrasion has been realized with every printing ink which has been tried, including a variety of flexographic inks and even solventless inks. The inks dry quickly because they remain at the surface of the plastic film so that the printed label stock can immediately be laid up in stacked sheets or wound up into roll form for storage.

The adhered, imprinted labels have surprisingly good resistance to outdoor weathering. This and the good ink receptivity are achieved at raw material costs equivalent to plastic film label stocks currently on the market and at reduced manufacturing costs compared to those label stocks which require an adhesion-promoting treatment of the ink-receiving surface.

EXAMPLE 1

687.2 grams (2.62 moles) of "Hylene" WS (an aliphatic diisocyanate), 0.6 gram of dibutyl tin dilaurate and 1245 grams (1.5 moles) of polycaprolactonediol (mol. wgt. 830) were placed in a reaction flask equipped with a stirrer, thermometer and separatory funnel. The flask was placed in a cold water bath, and 622 grams (4.75 moles) of 2-hydroxyethyl methacrylate (HEMA) was added dropwise. The rate of addition was controlled to keep the exotherm to 60° C. After 8 hours all of the HEMA was added. The mixture wall allowed to cool and set overnight. The next morning the flask was reheated to 60° C. for 2 hours to complete the reaction. The resultant urethane oligomer was a methacrylyl-capped polycaprolactoneurethane having the following basic structure:

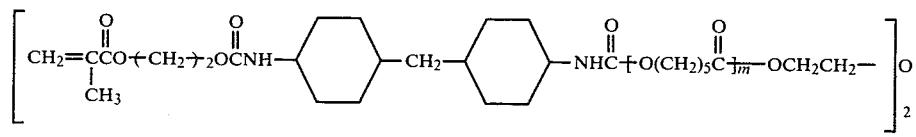

where m has an average value of about 3.8.

18.5 grams of the urethane oligomer, which was a straw-colored solid at room temperature, was heated to 50° C. and mixed with 18.5 grams of trimethylolpropane triacrylate (TMPTA) and 0.37 gram of a photoinitiator, isopropylbenzoin ether. The resultant syrup was knife-coated at a thickness of 75 micrometers onto a biaxially-oriented polypropylene carrier and cured for 3 minutes in a nitrogen atmosphere (oxygen content below 200 ppm) under low-pressure ultraviolet phosphor bulbs at a distance of 20–25 cm.

The resultant radiation-crosslinked polymer, which was a transparent plastic film lightly adhered to the polypropylene carrier, was laminated to a pressure-sensitive adhesive membrane which had been previously knife-coated onto a silicone-coated release paper to provide a transfer tape. The adhesive comprised a 90:10 copolymer of isooctyl acrylate and acrylic acid and had a thickness of 25 micrometers. Then the polypropylene carrier was removed from the resultant label stock which consisted of a transparent plastic film backing and a layer of pressure-sensitive adhesive. The thus-exposed face of the plastic film backing was flood-printed with a thin layer of nitrocellulose-based flexographic ink. The ink was allowed to air dry for 5 minutes and checked for anchorage using the test method described at col. 3, lines 5 et seq. of U.S. Pat. No. 3,967,031. No ink lifting was noted. Next the ink was tested for abrasion resistance using a brass wire bristle brush (1.2-cm bristles) to rub the ink coating under full hand pressure 10 times (5 in each direction). Almost no ink was rubbed off.

Samples of the label stock of this example which had not been printed were removed from the release paper, adhered by their own adhesive to stainless steel panels and exposed outdoors facing south at a 45° angle at Houston, Texas. After two years, the label stock appeared to be unchanged except for a slight degree of embrittlement of the plastic film backing.

After a sample of the label stock had been rotary-die-cut, its plastic film backing had sufficient integrity to permit the resultant ladder (the peripheries of the labels) to be removed using production equipment. When the die-cut labels were adhered by their own adhesive to various substrates such as glass and allowed to dwell for 24 hours at room temperature, they could not be removed without breaking the plastic film backing into tiny pieces.

EXAMPLE 2

249 grams of isophorone diisocyanate (available from Veba-Chemie AG), 0.6 gram dibutyl tin dilaurate, 533 grams of "Lexorez" 1831-65 (a crosslinked aliphatic polyol having a functionality of 3.4), and 218 grams of HEMA were reacted in the same manner as in Example 1. The resultant urethane oligomer, a methacrylyl-capped polyesterurethane, was a straw-colored solid at room temperature. 100 grams of this oligomer was made into a syrup by heating to 50° C. and mixing in 20 grams trimethylolpropane triacrylate, 70 grams of N-n-butylcarbamoylethyl methacrylate, 1.4 grams diethoxyacetophenone (a photoinitiator), 1.0 gram "Tinuvin" 770 (a UV absorber) and 0.25 gram "Irganox" 1010 (an antioxidant). The syrup was used to provide the plastic film backing of a pressure-sensitive adhesive label stock in the same manner as in Example 1. The label stock demonstrated ink anchorage and resistance of the ink to abrasion equivalent to the results reported in Example 1.

The film backing which had a thickness of 75 micrometers, had a tensile strength of 114 Newtons per 100 mm of width and an elongation of 21%.

Outdoor aging of unprinted label stock of this example evidenced no observable change in the film backing after 9 months.

EXAMPLE 3

220 grams of isophorone diisocyanate, 2 grams of dibutyl tin dilaurate, 1565 grams of "Lexorez" 1400-35 (a linear polyester polyol) and 138 grams of HEMA were reacted in the same manner as in Example 1. The resultant urethane oligomer, a methacrylyl-capped polyesterurethane, was a straw-colored solid at room temperature. 100 grams of this oligomer was made into a syrup by heating the oligomer to 50° C. and mixing in 20 grams of N-n-butylcarbamoylethyl methacrylate and 0.75 gram of diethoxyacetophenone. The syrup was knife-coated between two transparent, biaxially-oriented polypropylene films, thus protecting it from the air. This sandwich was passed under a medium-pressure ultraviolet lamp (80 watts/cm) for a total exposure time of 3-5 seconds, thus polymerizing the oligomer. After one of the polypropylene films was stripped away, the exposed face of the polymerized oligomer was laminated to the pressure-sensitive adhesive transfer tape of Example 1. The other polypropylene film was then stripped away, leaving a pressure-sensitive adhesive label stock having a plastic film backing. The exposed face of this plastic film backing, when printed and tested as in Example 1, demonstrated ink anchorage and resistance of the ink to abrasion equivalent to the results reported in Example 1. The plastic film backing was slightly tacky before being printed but was rendered tack-free by the flood printing.

The film backing, which had a thickness of 75 micrometers, had a tensile strength of 33 Newtons per 100 mm of width and an elongation of 168%. Because the film backing was fairly tough, labels cut from the label stock which had been adhered to substrates by their adhesive layers could be peeled away without breaking.

EXAMPLE 4

440 grams of isophorone diisocyanate, 1 gram of dibutyl tin dilaurate, 1200 grams of a polysiloxane polyol (DC Q4-3667 resin of Dow Chemical Co.) and 420 grams of HEMA were interreacted in the same manner as in Example 1, except that the exotherm was held to 50° C. The resultant urethane oligomer, methacrylyl-capped polysiloxaneurethane, was a straw-colored liquid at room temperature. 100 grams of the oligomer was mixed with 20 grams of N-n-butylcarbamoylethyl methacrylate and 0.75 gram of diethoxyacetophenone to provide a syrup which was used to provide a colorless plastic film in the same manner as in Example 3. After applying a thin coating of an adhesion-promoting primer to the plastic film, its primed face was laminated to a crude-rubber resin pressure-sensitive adhesive transfer tape. Ink applied to the unprimed surface of this label stock as in Example 1 exhibited excellent anchorage and resistance to abrasion.

The plastic film backing of this example was very tough. At its thickness of 75 micrometers, it had a tensile strength of 84 Newtons per 100 mm of width and an elongation of 122%.

EXAMPLE 5

100 grams of isocyanatoethyl acrylate, 0.3 gram of dibutyl tin dilaurate and 100 grams of a polyacrylic polyol (TSAX 1073 of General Mills) were mixed together in a reaction flask and slightly warmed to 45°-50° C. for one hour. At this time the reaction was complete. The resultant urethane oligomer, an acrylyl-capped polyacrylateurethane, was a colorless liquid at room temperature. 100 grams of this oligomer was mixed with 20 grams of N-n-butylcarbamoylethyl methacrylate and 0.75 grams of diethoxyacetophenone to provide a syrup which was used to provide a plastic film backing of a pressure-sensitive adhesive label stock in the same manner as in Example 3, except that the ultraviolet radiation was applied for 10 seconds. This label stock demonstrated good ink anchorage and resistance of the ink to abrasion equivalent to the results of Example 1. Its plastic film backing was quite friable. At its thickness of 75 micrometers, it had a tensile strength of 136 Newtons per 100 mm of width and an elongation of 2.2%.

EXAMPLE 6

430 grams of "Lexorez" 1831-65 (a polyol identified above), 201.3 grams of isophorone diisocyanate, 1 gram of dibutyl tin dilaurate, and 1.6 grams of "Irganox" 1010 were added to a reaction flask equipped with a stirrer, thermometer, and a heating and a cooling mantel. After heating at 75° C. for 3 hours, 514.4 grams of HEMA was added over a 10-minute period with cooling to hold the batch temperature between 65°–75° C. The batch was held at this temperature for 90 minutes to provide a methacrylyl-capped polyesterurethane.

230 grams of n-butyl isocyanate was added at such a rate that, with cooling, the temperature was held at 75° C., forming N-n-butylcarbamoylethyl methacrylate in situ. After one hour at 75° C., the batch was allowed to cool and stand overnight at room temperature. The next day it was heated to 65° C., and 201.6 grams of trimethylolpropane triacrylate and 8 grams of "Tinuvin" 144 were added with continuous stirring for one hour. The resultant syrup (without any photoinitiator) was knife-coated at a thickness of 75 micrometers onto a biaxially-oriented polypropylene carrier and polymerized under a nitrogen atmosphere using an electron beam processor ["Electrocurtain" of Energy Sciences, Inc.] as follows:
Electron dose: 5 megarads
Current: 3.9 ma at 200 Kv
Speed: 8 mpm
$O_2$ Level: 290 ppm The resultant plastic film was converted into pressure-sensitive adhesive label stock in the same manner as in Example 1. The label stock demonstrated ink anchorage and abrasion resistance of the ink equivalent to the result reported in Example 1.

The film backing, which has a thickness of 75 micrometers, had a tensile strength of 100 Newtons per 100 mm of width and an elongation of 9%.

EXAMPLE 7

To a 100-gram sample of the syrup of Example 6 was added 0.75 gram of diethoxyacetophenone with thorough mixing. This was polymerized by ultraviolet radiation to provide a plastic film which was converted into a pressure-sensitive adhesive label stock, all as described in Example 1. The label stock demonstrated ink anchorage and abrasion resistance equivalent to the results reported in Example 1.

The film backing, 75 micrometers thick, had a tensile strength of 150 Newtons per 100 mm of width and an elongation of 6%.

We claim:

1. Label stock comprising a flexible plastic film backing and a thin adhesive layer, said plastic film backing having a thickness of 25–150 micrometers and comprising a polymer of the urethane oligomer $$X(OCNH-Y-NHCO-Z)_n$$

wherein

Z is an end-capping addition-polymerizable moiety comprising acrylyl methacrylyl, allyl or vic-epoxy groups, Y is the divalent residue of an organic diisocyanate, $Y(NCO)_2$, Y being an alkylene group with 4 to 13 carbon atoms, a cycloalkylene group or an arylene group, X is the residue of oligomeric alcohol, $X(OH)_n$, selected from polyester polyols, polyether polyols, polyacrylate polyols, polyolefin polyols, and polysiloxane polyols and having a number average molecular weight of 500 to 5000 and a glass transition temperature below 250° K., and n has an average value of 1 to 4.

2. Label stock as defined in claim 1 wherein said urethane oligomer has the formula $$X[-O-CNH-Y-NHC-O(CH_2)_aO-C-C=CH_2]_n$$
$$\phantom{XXXXXXXXXXXXXXXXXXXXXXXXXXXXXXX}R$$

where X, Y and n are as defined in claim 1 except that n has an average value of 2 to 4, a is an integer having a value of 2 to 6 and R is hydrogen or methyl.

3. Label stock as defined in claim 1 wherein said urethane oligomer is a polyesterurethane acrylate or methacrylate.

4. Label stock as defined in claim 1 wherein said urethane oligomer is a polycaprolactoneurethane acrylate.

5. Label stock as defined in claim 1 wherein said urethane oligomer is a polysiloxaneurethane acrylate or methacrylate.

6. Label stock as defined in claim 1 wherein said urethane oligomer is a polyacrylateurethane acrylate or methacrylate.

7. Label stock as defined in claim 1 wherein said adhesive is a pressure-sensitive adhesive.

8. Label stock as defined in claim 1 wherein Y is

-continued $-(CH_2)_4-CH-$ , or
      |
      $COOCH_3$

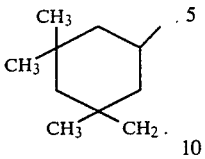

9. Label stock as defined in claim 1, having nitrocellulose-based flexographic ink applied to the untreated exposed face of the flexible plastic film backing, the applied ink having good resistance to abrasion.

10. Label stock as defined in claim 1 wherein a reactive diluent has been reacted with said oligomer.

11. Label stock as defined in claim 10 wherein said reactive diluent was a crosslinking reactive diluent.

12. Label stock as defined in claim 11 wherein the crosslinked reactive diluent was a multifunctional acrylate.

13. Method of making label stock comprising the steps of (1) polymerizing the urethane oligomer

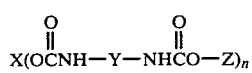

wherein

Z is an end-capping addition-polymerizable moiety comprising acrylyl, methacrylyl, allyl or vic-epoxy groups, Y is the divalent residue of an organic diisocyanate, $Y(NCO)_2$, Y being an alkylene group with 4 to 13 carbon atoms, a cycloalkylene group or an arylene group, X is the residue of oligomeric alcohol, $X(OH)_n$, selected from polyester polyols, polyether polyols, polyacrylate polyols, polyolefin polyols, and polysiloxane polyols and having a number average molecular weight of 500 to 5000 and a glass transition temperature below 250° K., and n has an average value of 1 to 4, to provide a flexible plastic film having a thickness of 25-150 micrometers, and (2) adhering a thin adhesive layer to the plastic film.

14. Method as defined in claim 13 wherein step (1) involves the sub-steps of
  (a) combining the urethane oligomer and a photo initiator into a syrup of a coatable viscosity,
  (b) coating the syrup onto a substrate, and
  (c) irradiating the coating with ultraviolet light to polymerize the urethane oligomer.

15. Method as defined in claim 14 wherein sub-step (a) of step (1) includes the addition of a reactive diluent.

16. Method as defined in claim 15 wherein the reactive diluent is a crosslinking reactive diluent.

17. Method as defined in claim 16 wherein the crosslinking reactive diluent is a multifunctional acrylate or methacrylate.

* * * * *